United States Patent
Hwang et al.

(10) Patent No.: US 7,924,674 B2
(45) Date of Patent: Apr. 12, 2011

(54) RECORDING METHOD TO GENERATE A BOX TYPE RECORDING PATTERN WITH A FIRST PULSE HAVING A FIRST POWER LEVEL AND A SECOND PULSE HAVING A SECOND POWER LEVEL, AND RECORDING APPARATUS, AND OPTICAL RECORDING MEDIUM FOR THE SAME

(75) Inventors: Wook-yeon Hwang, Seoul (KR); Kyung-geun Lee, Seongnam-si (KR); Tatsuhiro Otsuka, Suwon-si (KR); An-sik Jeong, Hwaseong-si (KR); In-joo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 11/690,357

(22) Filed: Mar. 23, 2007

(65) Prior Publication Data
US 2007/0247993 A1 Oct. 25, 2007

(30) Foreign Application Priority Data
Mar. 24, 2006 (KR) .................. 10-2006-0026987
Jan. 9, 2007 (KR) .................. 10-2007-0002675

(51) Int. Cl.
*G11B 7/00* (2006.01)
(52) U.S. Cl. .................. 369/59.11; 369/116; 369/47.53
(58) Field of Classification Search ............... 369/59.11, 369/116, 47.53
See application file for complete search history.

(56) References Cited

U.S. PATENT DOCUMENTS

| | | | |
|---|---|---|---|
| 6,072,759 A | 6/2000 | Maeda et al. | |
| 6,125,084 A | 9/2000 | Sukeda et al. | |
| 6,280,810 B1 * | 8/2001 | Nakamura et al. | 428/64.1 |
| 6,819,644 B2 * | 11/2004 | Sasaki et al. | 369/59.12 |
| 7,301,883 B1 * | 11/2007 | Balasubramanian et al. | 369/116 |
| 7,450,480 B2 * | 11/2008 | Narumi et al. | 369/47.5 |
| 7,586,823 B2 * | 9/2009 | Yamaguchi et al. | 369/59.11 |
| 2003/0067857 A1 | 4/2003 | Shirota et al. | |
| 2003/0081523 A1 | 5/2003 | Miyagawa et al. | |

(Continued)

FOREIGN PATENT DOCUMENTS
CN 1552063 12/2004
(Continued)

OTHER PUBLICATIONS

Office Action issued in Chinese Patent Application No. 2007100894555 on Dec. 5, 2008.
(Continued)

*Primary Examiner* — Thang V Tran
*Assistant Examiner* — Latanya Bibbins
(74) *Attorney, Agent, or Firm* — NSIP Law

(57) ABSTRACT

A recording method, a recording apparatus, and an optical recording medium that can improve quality of a signal reproduced from a high multi-speed recording medium. The recording method includes generating a box type recording pattern including a first pulse, which has a duration determined according to a length of a recording mark and which has a first power level, and a second pulse which has a second power level different from that of the first power level, and recording data according to the box type recording pattern.

12 Claims, 13 Drawing Sheets

U.S. PATENT DOCUMENTS

| | | |
|---|---|---|
| 2003/0137909 A1 | 7/2003 | Ito et al. |
| 2003/0151994 A1* | 8/2003 | Tasaka et al. .............. 369/47.53 |
| 2004/0017752 A1 | 1/2004 | Furumiya et al. |
| 2004/0017755 A1* | 1/2004 | Kato .......................... 369/59.11 |
| 2006/0153038 A1 | 7/2006 | Yamaguchi et al. |

FOREIGN PATENT DOCUMENTS

| | | |
|---|---|---|
| EP | 1 329 879 | 7/2003 |
| EP | 1 329 888 | 7/2003 |
| EP | 1 361 571 | 11/2003 |
| EP | 1 479 072 | 11/2004 |
| JP | 2003-323769 | 11/2003 |
| KR | 1999-0036193 | 5/1999 |
| WO | WO97/06530 | 2/1997 |
| WO | WO 2004/077419 | 9/2004 |
| WO | WO 2007/111435 A1 | 10/2007 |

OTHER PUBLICATIONS

Preliminary Notice of the First Office Action issued in Taiwanese Patent Application No. 094116841 on Dec. 15, 2008.

International Search Report dated Feb. 6, 2008 of the European patent Application No. 07104514.0.

Search report issued in PCT International Application No. PCT/KR2007/001388 on Jun. 21, 2007.

Canadian Office Action issued on May 28, 2010, in corresponding Canadian Application No. 2 645 822 (9 pages).

Office Action issued in Malaysian Patent Application No. PI 20082824 on Jun. 5, 2009.

* cited by examiner

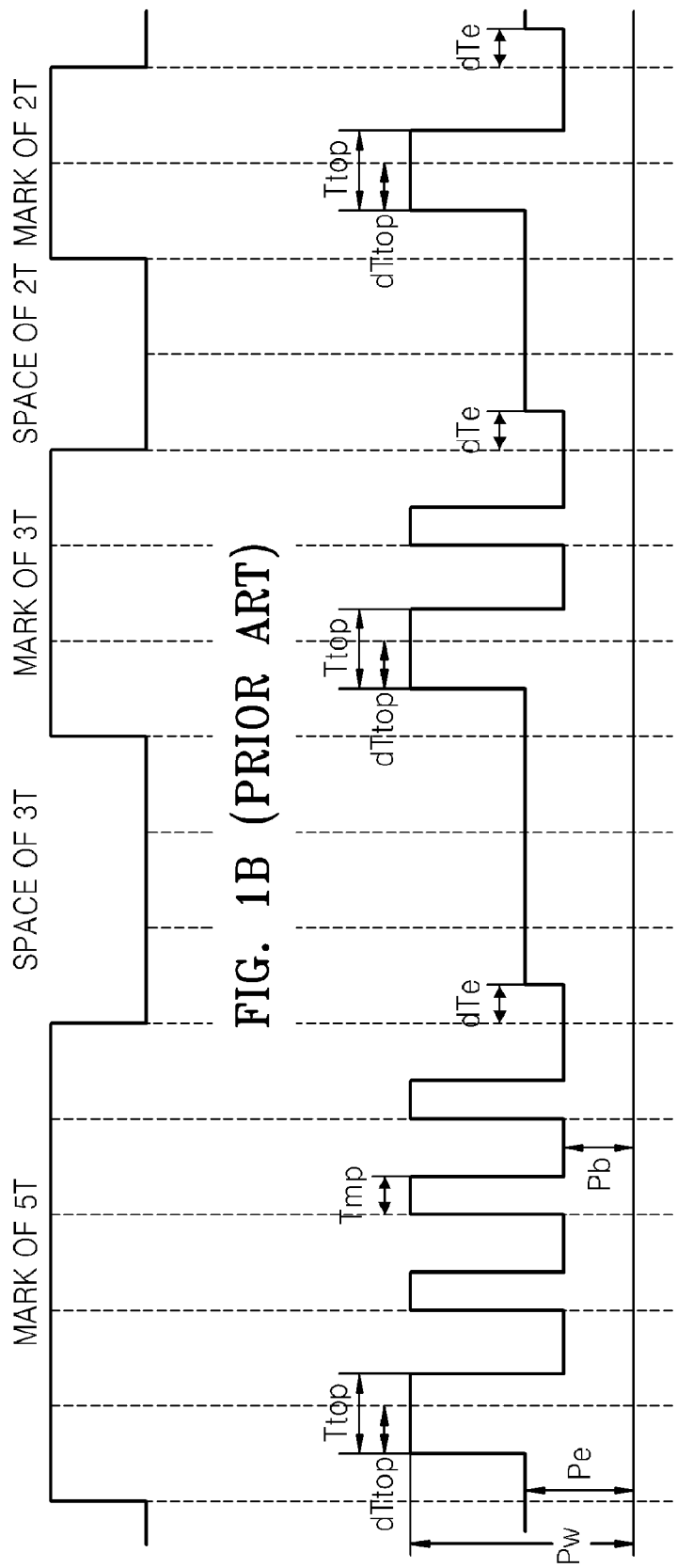

FIG. 6
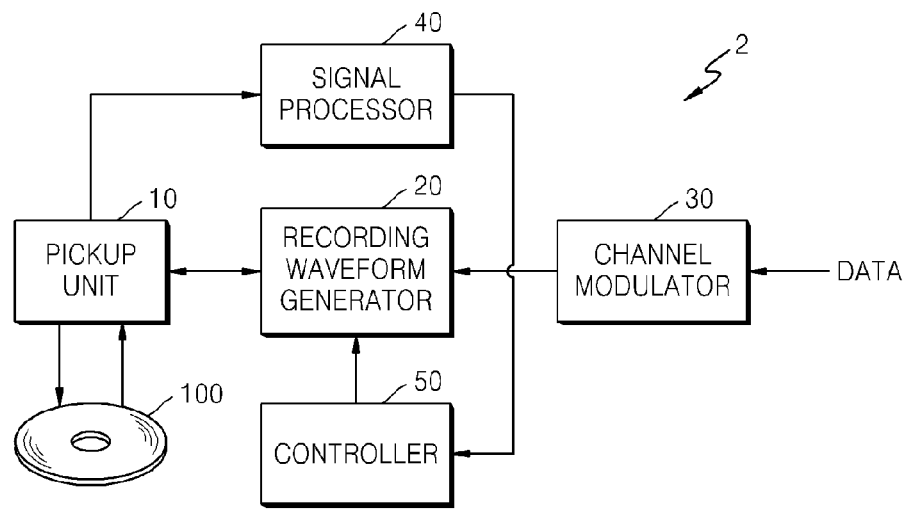
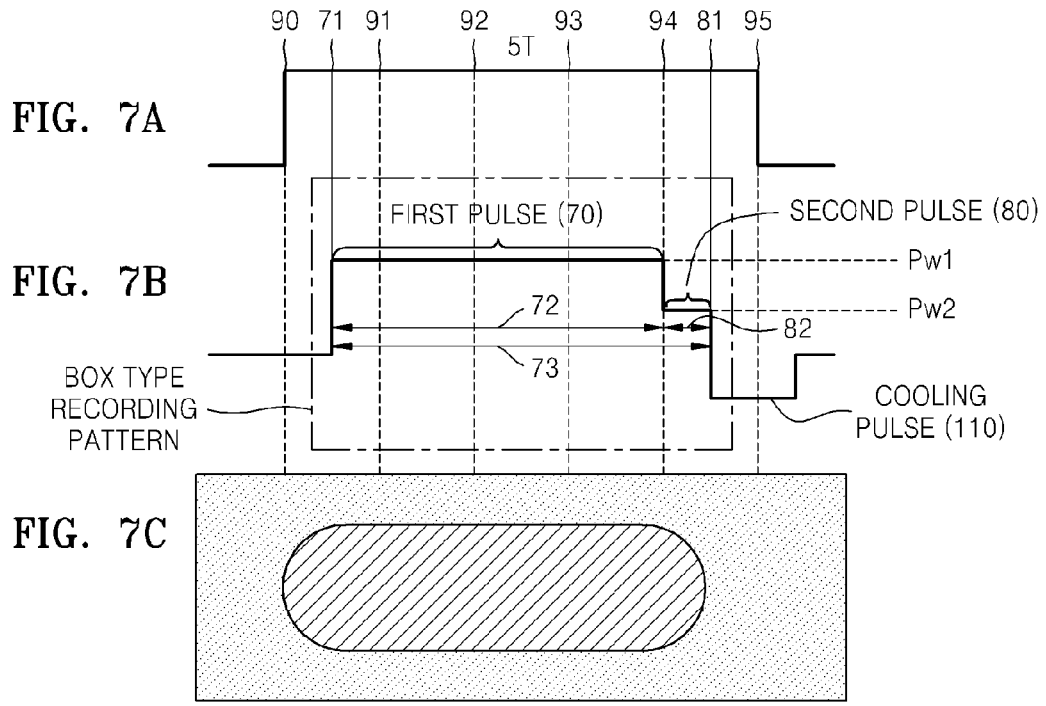
FIG. 7A
FIG. 7B
FIG. 7C

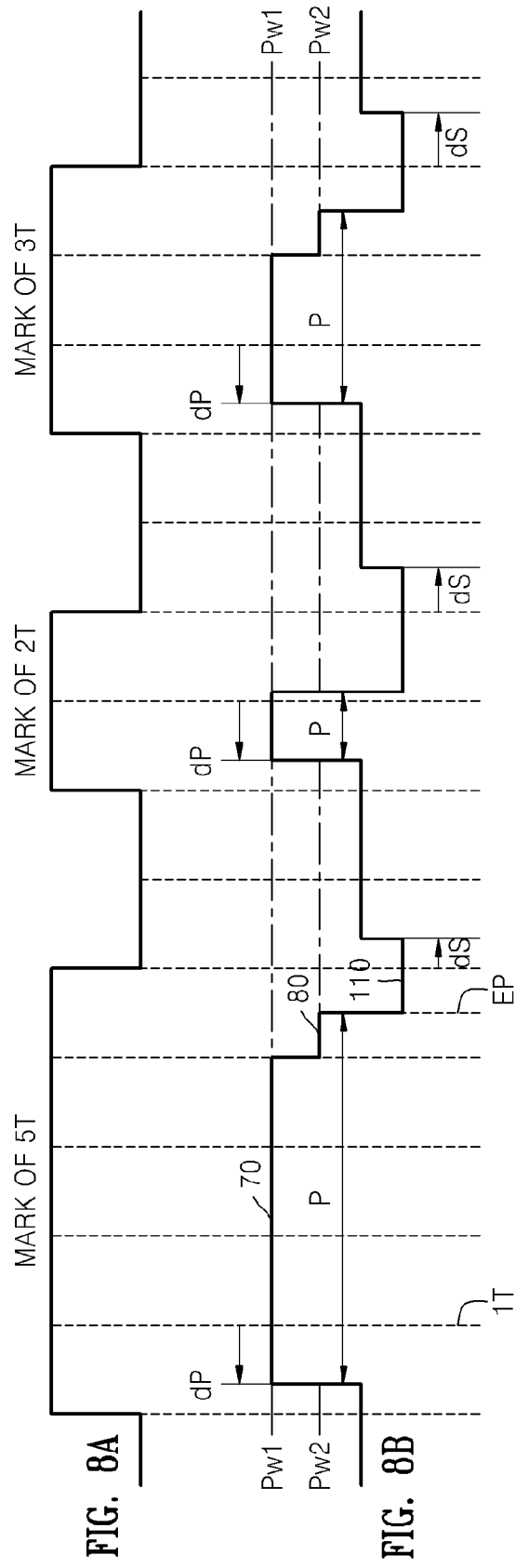

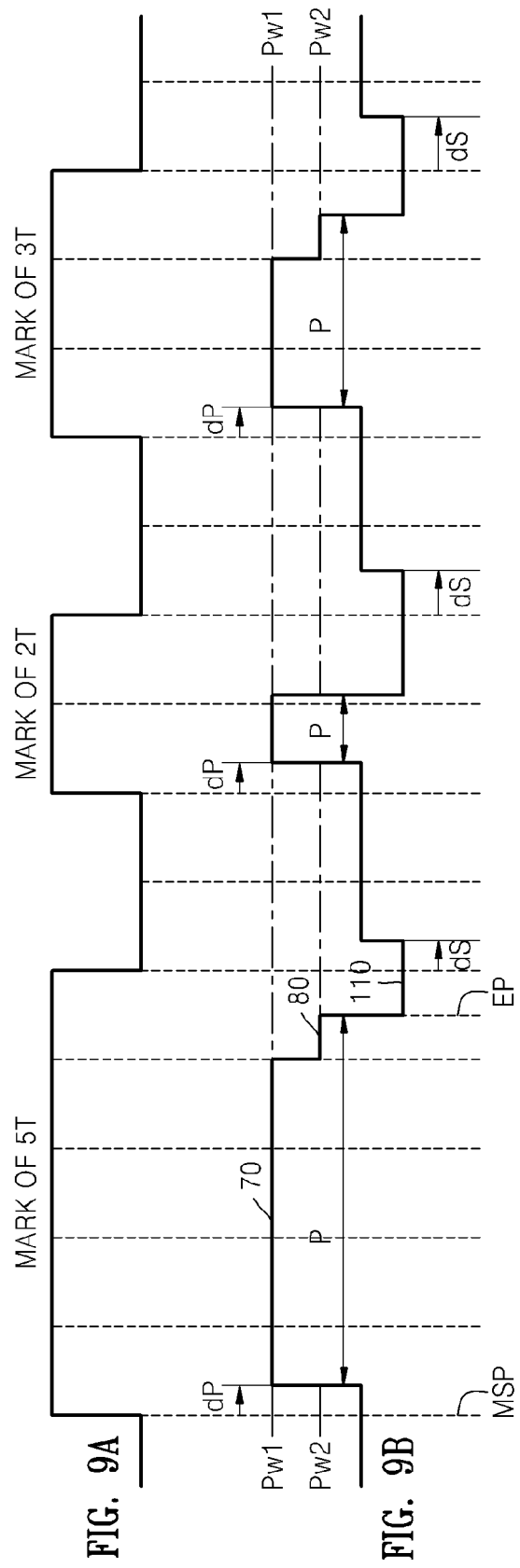

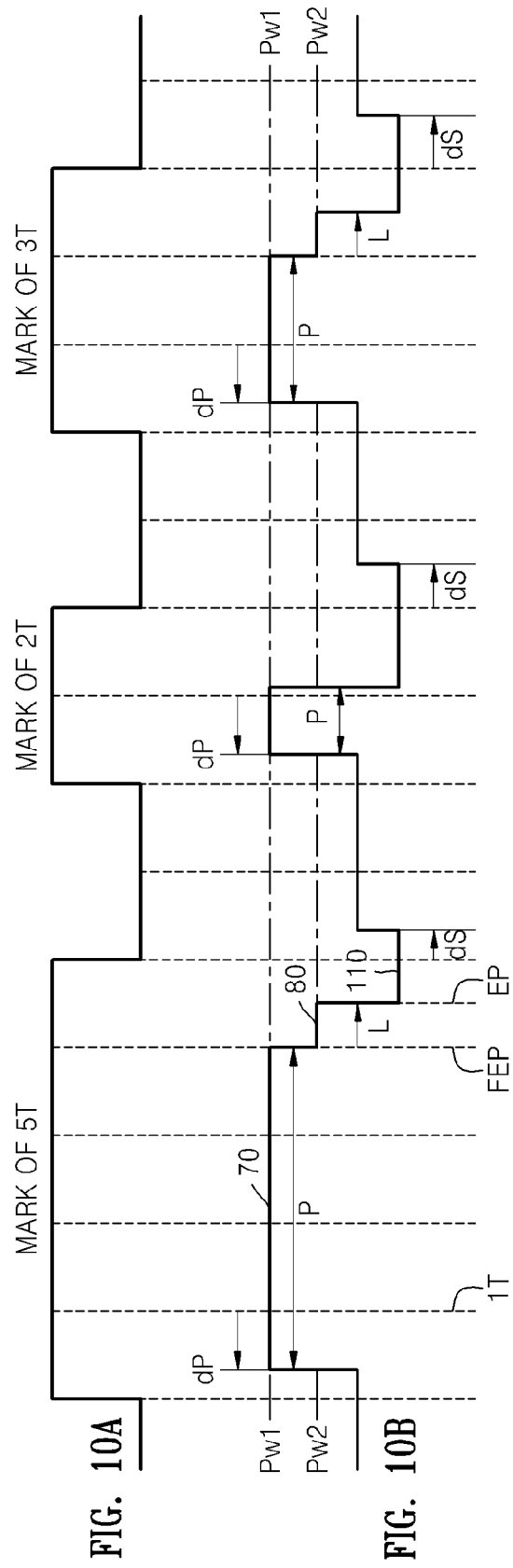

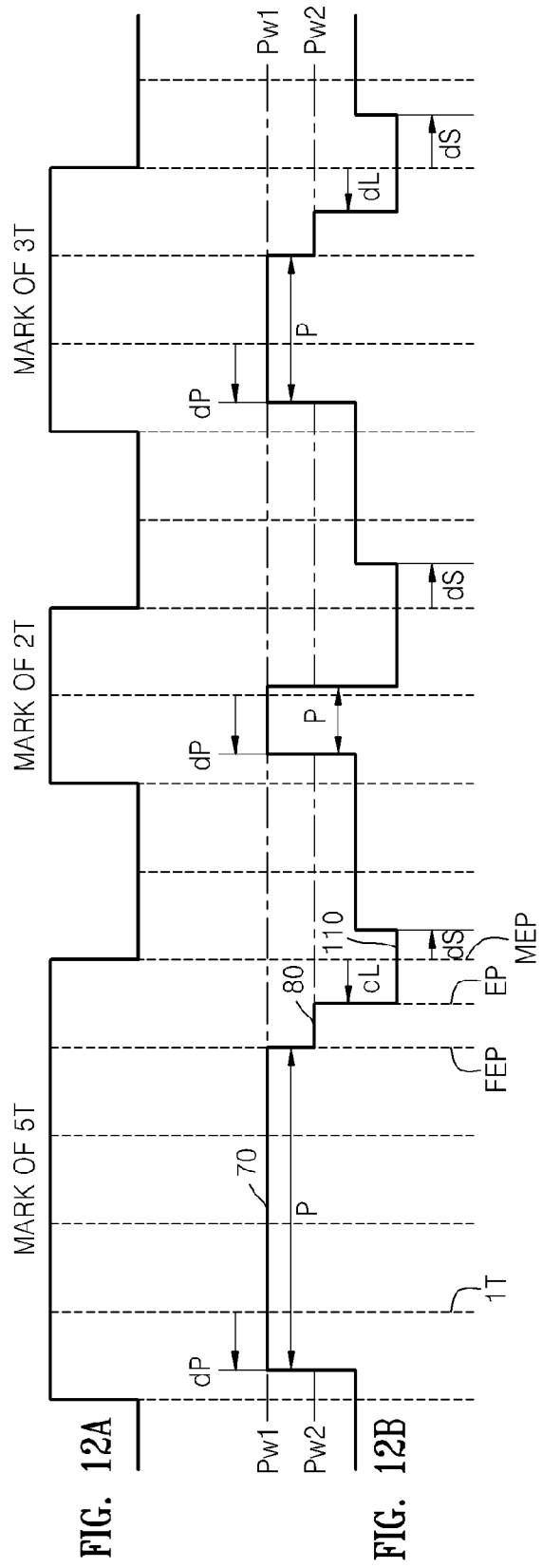

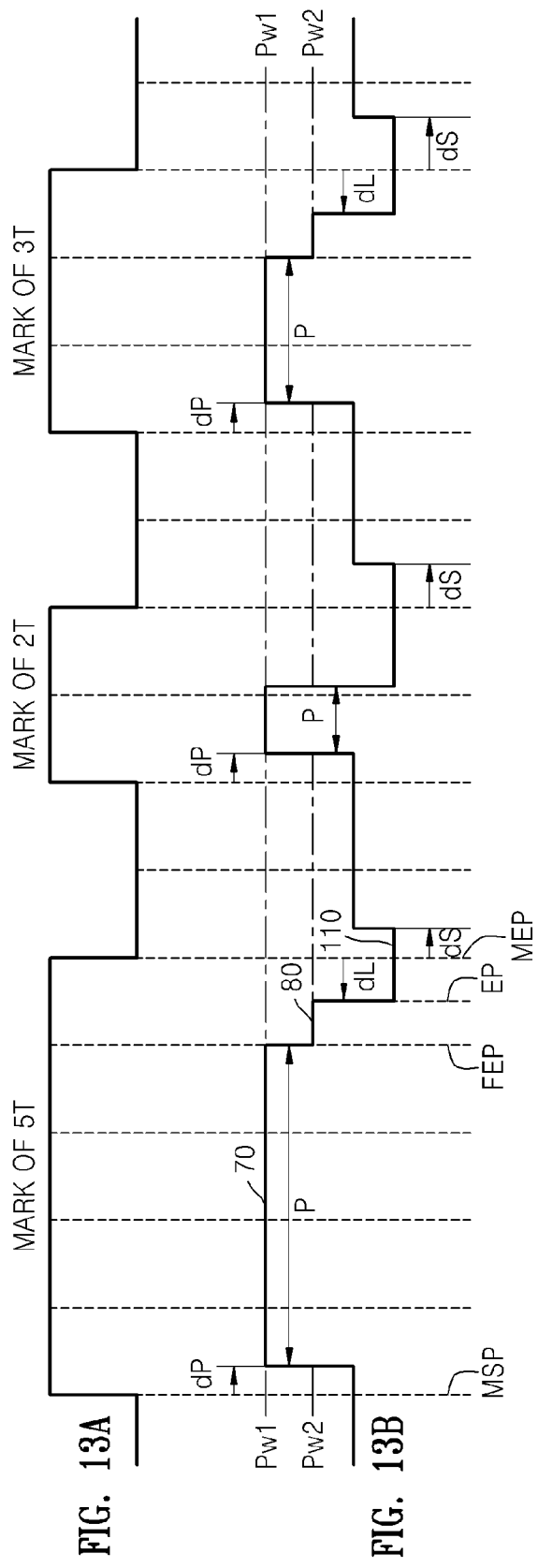

RECORDING METHOD TO GENERATE A BOX TYPE RECORDING PATTERN WITH A FIRST PULSE HAVING A FIRST POWER LEVEL AND A SECOND PULSE HAVING A SECOND POWER LEVEL, AND RECORDING APPARATUS, AND OPTICAL RECORDING MEDIUM FOR THE SAME

CROSS-REFERENCE TO RELATED APPLICATIONS

This application claims all benefits accruing under 35 U.S.C. §119 from Korean Patent Application Nos. 2006-26987, filed on Mar. 24, 2006, 2007-2675, filed on Jan. 9, 2007, in the Korean Intellectual Property Office, the disclosures of which are incorporated herein by reference.

BACKGROUND OF THE INVENTION

1. Field of the Invention

Aspects of the present invention relate to a recording method, a recording apparatus, and an optical recording medium thereof that can improve the quality of a signal reproduced from a high multi-speed recording medium, and more particularly, to an information storage medium having an optimal recording waveform to improve a jitter effect caused by a fast recording process and a method and apparatus for recording data in the information storage medium.

2. Description of the Related Art

In general, information storage media, for example, optical discs, are widely used with optical pickup devices which record and/or reproduce information in a non-contact manner. Information storage media may be classified into compact discs (CDs) and digital versatile discs (DVDs) according to the information recording capacities of the information storage media. Examples of a recordable disc that can write, erase, and read information include a 650 MB CD-recordable (CD-R), a CD-rewritable (CD-RW), a 4.7 GB DVD+R/RW, a DVD-random access memory (RAM), and a DVD-R/RW. Examples of a read-only disc include a 650 MB CD-read only memory (ROM) and a 4.7 GB DVD-ROM. Furthermore, a high definition DVD (HD-DVD) having a recording capacity of over 20 GB is currently being developed.

When data is recorded in an optical disc, which is one type of an optical recording medium, marks are formed in tracks of the optical disc. For a read-only optical disc, such as a CD-ROM and a DVD-ROM, the marks are produced in the form of pits. For a recordable optical disc, such as a CD-R/RW and a DVD-R/RW/RAM, a phase change layer is coated with a phase change material that changes between an amorphous state and a crystalline state. The marks are formed in the recordable optical disc when the phase change layer undergoes a phase change. In order to optimize recording and/or reproducing features, the recordable optical disc employs write strategies. The write strategies are applied differently depending on the type of disc being written to. A writing condition may vary depending on disc drives used with the optical disc, which may result in incompatibility between an optical recording medium and a disc drive. In particular, an increased recording speed is needed to meet the demands of users who want to perform fast recording of information on optical discs having high storage capacity.

A high definition optical recording apparatus, such as a next generation blu-ray disc (BD) recorder, performs recording by using a run length limited (RLL)(1,7) code method in which a minimum value of a time period T of a clock pulse is equal to 2 T. When the (RLL)(1,7) code method is used, a laser output waveform for forming a recording mark with a predetermined length is composed of multi-pulses in which the number of write pulses generally increases according to the length of the recording mark. As shown in FIG. 1, if the length of the recording mark is equal to an integer multiple of N of the time period T, the laser output waveform uses a write strategy composed of N−1 write pulses.

When this method is used, it is difficult to switch a light source, i.e., a laser diode, in order to form multi-pulses at a high multi-speed. In addition, since recording is rapidly performed, there is no benefit to using multi-pulses. Moreover, when heat is rapidly emitted from the laser diode, sufficient heat is not easily transferred to an optical recording medium. Thus, the recording mark is not properly formed. In order to solve these problems, a write strategy using a new pulse is required.

FIGS. 1A and 1B illustrate a waveform diagram of a conventional recording waveform using a conventional multi-pulse write strategy. FIG. 1A illustrates a waveform diagram of a conventional recording waveform, and FIG. 1B illustrates a conventional multi-pulse write strategy. Referring to FIGS. 1A and 1B, a conventional recording waveform using a multi-pulse recording pattern is used to record non return to zero inverted (NRZI) data. Here, T denotes the cycle of a reference recording and/or reproducing clock signal. According to a method of recording a mark edge, a mark is recorded when the NRZI data is at a high level, and a space is formed when the NRZI data is at a low level. A recording waveform used to record the mark is referred to as a recording pattern. A recording waveform used to form the space (i.e. to erase the mark) is referred to as an erase pattern. In the conventional recording waveform, multi-pulses are used for forming the recording pattern, and a power level of each pulse is regulated to have one of three levels: Pw, Pe, and Pb. Specifically, the recording multi-pulses of the recording pattern used to form the marks have the power levels Pw and Pb, and the recording waveform used to form the space has the power level Pe. The power level Pe of the erase pattern for forming a space using low level NRZI data is maintained to be a predetermined direct current (DC) level. Here, Pw denotes a write power level, Pb denotes a bias power level, and Pe denotes an erase power level.

Referring to FIG. 1B, an N−1 write strategy is exemplified as a conventional multi-pulse recording strategy. A laser output waveform for forming a recording mark with a predetermined length is composed of multi-pulses in which the number of write pulses generally increases according to the length of the recording mark. If the length of the recording mark is an integer multiple of N of a time period T (e.g., 2 T 3 T etc), the laser output waveform has N−1 write pulses. For example, in order to record the recording mark of 5 T, the laser output waveform has four write pulses (5−1=4).

Table #1 below shows conditions for a recording method using a multi-pulse type write strategy.

| | |
|---|---|
| Laser wavelength | 405 nm |
| Numerical aperture | 0.85 |
| User data transfer rate | 35.965(Mbit/s) × 4 multi-speed |
| Recording velocity | 4.92(m/s) × 4 multi-speed |
| User data capacity | 25 Gbyte |
| Track pitch | 0.32 μm |

Table #2 below shows a result obtained by comparing recording quality (also referred to as "jitter") of recordings performed at various multi-speeds by using the conventional multi-pulse write strategy shown in FIG. 1.

| | |
|---|---|
| Jitter at 1× multi-speed recording | 5.6% |
| Jitter at 2× multi-speed recording | 6.4% |
| Jitter at 4× multi-speed recording | 10.0% |

Referring to Table #2 above, when recording is performed by using the conventional N−1 write strategy at 4× multi-speed (a rotation speed of about 10,000 RPM), jitter substantially increases in comparison with the case of jitter at 1× multi-speed recording or jitter at 2× multi-speed recording.

FIGS. 2A, 2B and 2C illustrate a simulation result of a recording mark formed in a blu-ray disc recordable (BD-R) during the process of 4× multi-speed recording using a conventional multi-pulse type write strategy. Specifically, FIG. 2A illustrates data for a recording mark of length 5 T; FIG. 2B illustrates a conventional multi-pulse write strategy; and FIG. 2C illustrates a simulation result of the recording mark using the conventional multi-pulse type write strategy shown in FIG. 2B. As shown by the irregular shape of the formed recording mark in the simulation result of FIG. 2C, heat transferred in response to a write pulse does not effectively form the recording mark at high speed. Since the simulation result of the recording mark shown in FIG. 2C has an irregular shape, it is not easy to optimally form the recording mark or to regulate the length of the recording mark by using the conventional multi-pulse type write strategy shown in FIG. 2B.

FIGS. 3A and 3B illustrate a waveform diagram of a conventional write strategy having a box type recording pattern using one pulse. FIG. 3A illustrates a waveform diagram of a conventional recording waveform, and FIG. 3B illustrates a conventional box type recording pattern. Referring to FIGS. 3A and 3B, a laser output waveform for forming a recording mark having a predetermined length is composed of only one pulse, irrespective of the length of the recording mark. A time period T is determined by the length of each pulse.

Table #3 below shows conditions for a recording method using the conventional box type write strategy shown in FIG. 3.

| | |
|---|---|
| Laser wavelength | 405 nm |
| Numerical aperture | 0.85 |
| User data transfer rate | 35.965(Mbit/s) × 4 multi-speed |
| Recording velocity | 4.92(m/s) × 4 multi-speed |
| User data capacity | 25 Gbyte |
| Track pitch | 0.32 μm |

Table #4 below shows a result of recording quality ("jitter") at 4× multi-speed recording by using the conventional box type write strategy.

| | |
|---|---|
| Jitter at 4× multi-speed recording | 6.8% |

FIGS. 4A, 4B and 4C illustrate a simulation result of a recording mark formed in a BD-R during the process of 4× multi-speed recording using the conventional box type write strategy shown in FIG. 3.

The conventional box type write strategy, which records at 4× multi-speed (a rotation speed of about 10,000 RPM), is used to solve the problems resulting from the conventional multi-pulse type write strategy. FIG. 4A illustrates data for a recording mark of length 5 T, FIG. 4B illustrates a conventional box type write strategy; and FIG. 4C illustrates a simulation result of the recording mark using the conventional box type write strategy shown in FIG. 4B. As FIG. 4C illustrates, the conventional box type write strategy decreases jitter in comparison with the conventional multi-pulse type write strategy.

As shown by the simulation result of FIG. 4C, the recording mark has a relatively uniform shape. This shows that sufficient heat is transferred so as to form the recording mark. However, unlike the simulation result shown in FIG. 2C, in the simulation result shown in FIG. 4C, a trailing portion of the recording mark is larger than a leading portion of the recording mark. This is because heat accumulation at the trailing portion of the recording mark increases relative to the heat accumulation accumulated at the trailing portion of the recording mark in the multi-pulse type write strategy. Thus, it is difficult to regulate the formation of a mark edge of the trailing portion of the recording mark.

In the above two methods, when recording is performed at a rotation speed equal to or greater than about 10,000 RPM, switching a laser diode to implement the conventional multi-pulse type write strategy as currently used is difficult. Furthermore, since the amount of heat transferred to a recording medium is small per unit time, using the conventional multi-pulse type write strategy for high speed recording is not appropriate for the formation of the recording mark. Therefore, the conventional box type write strategy may instead be used for recording so that more heat can be transferred per unit time with a pulse structure that is simpler to achieve in terms of switching the laser diode. As a result, the conventional box type write strategy decreases jitter compared to the jitter generated by the conventional multi-pulse type write strategy.

However, the simulation result shown in FIG. 4C illustrates that the trailing portion of the recording mark is larger than the leading portion of the recording mark. This change in the width of the recording mark occurs because of heat accumulation. Accordingly, an optimal write strategy is required for high multi-speed recording.

SUMMARY OF THE INVENTION

Aspects of the present invention provide a recording apparatus, a recording method, and an optical recording medium that can improve quality of a reproducing signal by facilitating regulation of a trailing portion of a mark in a high multi-speed recording medium.

Additional aspects and/or advantages of the invention will be set forth in part in the description which follows and, in part, will be obvious from the description, or may be learned by practice of the invention.

According to an aspect of the present invention, a method of recording data in an optical recording medium comprises: generating a box type recording pattern including a first pulse, which has a duration determined according to a length of a recording mark and which has a first power level, and a second pulse which has a second power level different from the first power level, and recording data according to the box type recording pattern.

According to an aspect of the present invention, the second pulse is positioned at an edge portion of the box type recording pattern so as to regulate an edge portion of the recording mark.

According to an aspect of the present invention, when the recording mark has a length of nT, the second pulse starts at a time point of (n−1)T.

According to an aspect of the present invention, when the recording mark has a length of nT and n is an integer, the first pulse of the box type recording pattern starts at a first position separated by a first distance from a time point that is 1 T from a start point for forming the recording mark or at a second position separated by a second distance from the start point for forming the recording mark.

According to an aspect of the present invention, the second pulse is generated immediately following the first pulse, and a length of the box type recording pattern is determined based on a length from a start point of the first pulse to an end point of the second pulse.

According to an aspect of the present invention, the second pulse is generated immediately following the first pulse, and a length of the box type recording pattern is determined based on a total duration of the first pulse and the second pulse.

According to an aspect of the present invention, the second pulse is generated immediately following the first pulse, the duration of the first pulse is determined by a distance from a start point of the first pulse to a start point of the second pulse, and the second pulse may end at a second position separated by a second distance from an end point of the record mark.

According to an aspect of the present invention, the generating of the recording pattern comprises reading parameter information for the box type recording pattern from the optical recording medium and generating the box type recording pattern according to the read parameter information.

According to another aspect of the present invention, a method of recording information on a recording pattern in an optical recording medium includes generating the information on the recording pattern, and recording the generated information on the recording pattern in a predetermined area of the optical recording medium, wherein the information on the recording pattern comprises parameter information on a box type recording pattern comprising a first pulse, which has a duration determined according to a length of a recording mark and which has a first power level, and a second pulse which has a second power level different from the first power level.

According to another aspect of the present invention, the parameter information on the box type recording pattern comprises a start point of the first pulse at a first position separated by a first distance from a time point that is 1 T from a start point for forming the recording mark, and a length of the box type recording pattern determined by a length from the start point of the first pulse to an end point of the second pulse, wherein the recording mark has a length of nT and n is an integer.

According to another aspect of the present invention, the parameter information on the box type recording pattern comprises a start point of the first pulse at a first position separated by a first distance from a start point for forming the recording mark, and a length of the box type recording pattern determined by a length from the start point of the first pulse to an end point of the second pulse.

According to another aspect of the present invention, the parameter information on the box type recording pattern comprises a start point of the first pulse at a first position separated by a first distance from a time point that is 1 T from the start point for forming the recording mark, a duration of the first pulse determined by a distance from the start point of the first pulse to a start point of the second pulse, and an end point of the second pulse which ends at a second position separated by a second distance from an end point of the first pulse, wherein the recording mark has a length of nT and n is an integer.

According to another aspect of the present invention, the parameter information on the box type recording pattern comprises a start point of the first pulse at a first position separated by a first distance from a time point for forming the recording mark, a duration of the first pulse determined by a distance from the start point of the first pulse to a start point of the second pulse, and an end point of the second pulse which ends at a second position separated by a second distance from an end point of the first pulse.

According to another aspect of the present invention, the parameter information on the box type recording pattern comprises a start point of the first pulse at a first position separated by a first distance from a time point that is 1 T from the start point for forming the recording mark, a duration of the first pulse determined by a distance from the start point of the first pulse to a start point of the second pulse, and an end point of the second pulse which ends at a second position separated by a second distance from an end point of the record mark, wherein the recording mark has a length of nT, and n is an integer.

According to another aspect of the present invention, the parameter information on the box type recording pattern comprises a start point of the first pulse at a first position separated by a first distance from a time point for forming the recording mark, a duration of the first pulse determined by a distance from the start point of the first pulse to a start point of the second pulse, and an end point of the second pulse which ends at a second position separated by a second distance from an end point of the recording mark.

According to another aspect of the present invention, the parameter information on the box type recording pattern further comprises an end point of a cooling pulse separated by a predetermined distance from an end point of the recording mark.

According to another aspect of the present invention, an apparatus for recording data as a recording mark on an optical recording medium comprises a recording waveform generator which generates a box type recording pattern including a first pulse, which has a duration determined according to a length of a recording mark and which has a first power level, and a second pulse which has a second power level different from the first power level, and a pickup unit which records the recording mark according to the box type recording pattern.

According to another aspect of the present invention, an apparatus for recording parameter information in an optical recording medium comprises: a controller which generates parameter information on a box type recording pattern including a first pulse, which has a duration determined according to a length of a recording mark and which has a first power level, and a second pulse which has a second power level different from the first power level, and a pickup unit which records the generated information on the recording pattern in an area of the optical recording medium.

According to another aspect of the present invention, an optical recording medium for a recording and/or reproducing apparatus comprises an area where parameter information on a recording pattern is recorded, wherein the parameter information on the recording pattern comprises parameter information on a box type recording pattern including a first pulse, which has a duration determined according to a length of a recording mark and which has a first power level, and a second pulse which has a second power level different from the first power level, and the parameter information is used to offset heat accumulation generated during recording to prevent changes in a width of the recording mark in the recording pattern.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 1A illustrates a waveform diagram of a conventional recording waveform;

FIG. 1B illustrates a conventional multi-pulse recording pattern;

FIG. 6 is a block diagram of a recording apparatus according to another embodiment of the present invention;

FIG. 7A illustrates a recording mark of length 5 T;

FIG. 7B illustrates a box type recording pattern for recording the mark of length 5 T shown in FIG. 7A according to an embodiment of the present invention;

FIG. 7C illustrates a recording mark formed by using the box type recording pattern of FIG. 7B according to an embodiment of the present invention;

FIG. 8A illustrates a waveform diagram of a recording waveform;

FIG. 8B illustrates a first example of a box type recording pattern according to an embodiment of the present invention;

FIG. 9A illustrates a waveform diagram of a recording waveform;

FIG. 9B illustrates a second example of a box type recording pattern according to an embodiment of the present invention;

FIG. 10A illustrates a waveform diagram of a recording waveform;

FIG. 10B illustrates a third example of a box type recording pattern according to an embodiment of the present invention;

FIG. 12A illustrates a waveform diagram of a recording waveform;

FIG. 12B illustrates a fifth example of a box type recording pattern according to an embodiment of the present invention;

FIG. 13A illustrates a waveform diagram of a recording waveform;

FIG. 13B illustrates a sixth example of a box type recording pattern according to an embodiment of the present invention;

DETAILED DESCRIPTION OF THE EMBODIMENTS

Figure 2A:
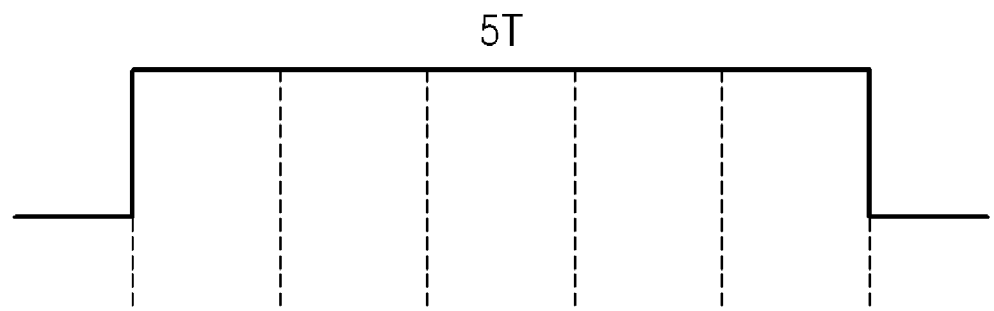
FIG. 2A illustrates a recording mark of length 5 T.
Figure 2B:
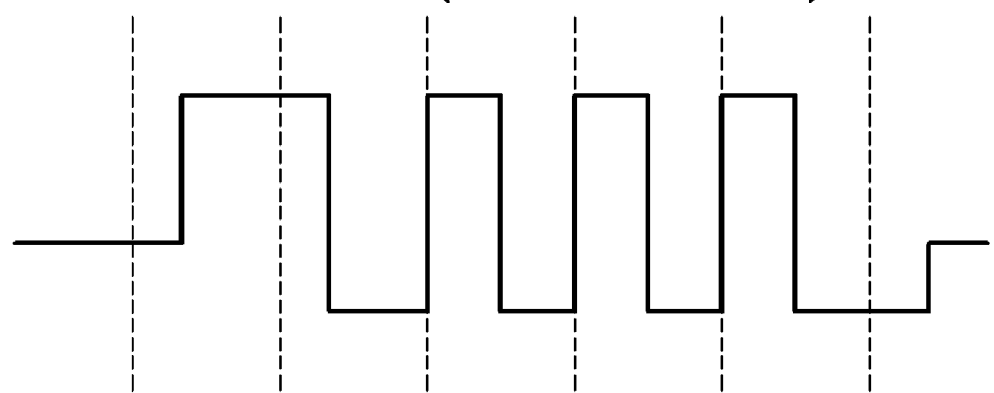
FIG. 2B illustrates an example of a multi-pulse recording pattern used to form the recording mark illustrated in FIG. 2A.
Figure 2C:
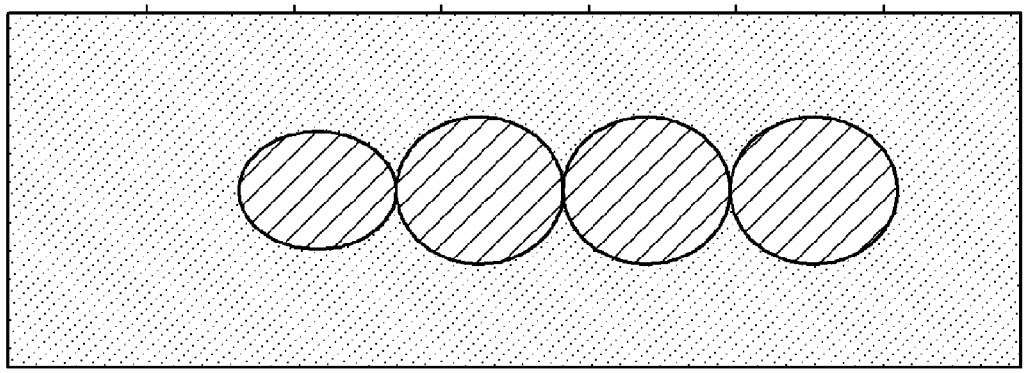
FIG. 2C illustrates a simulation result of the recording mark formed by using the multi-pulse recording pattern shown in FIG. 2B.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
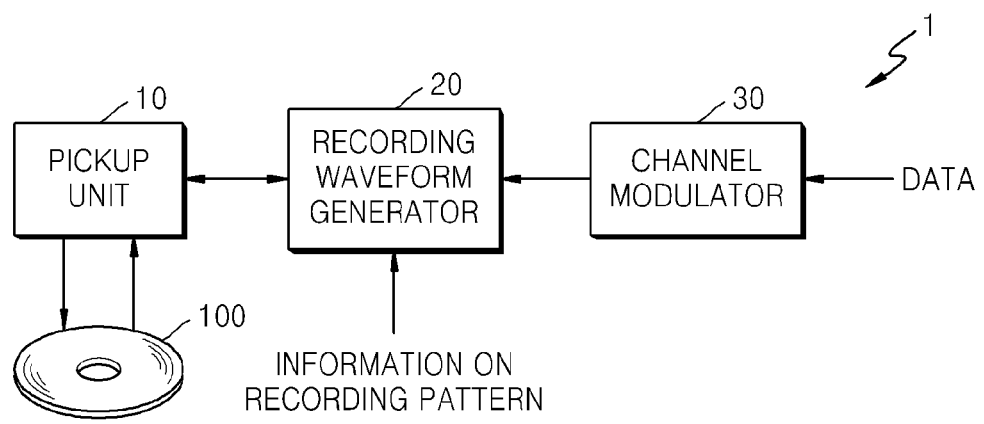
FIG. 5 is a block diagram of a recording apparatus according to an embodiment of the present invention.

FIG. 5 is a block diagram of a recording apparatus 1 according to an embodiment of the present invention. Referring to FIG. 5, the recording apparatus 1 records data by forming a mark or a space in an optical recording medium 100. The recording apparatus 1 includes a pickup unit 10, a recording waveform generator 20, and a channel modulator 30.

The channel modulator 30 modulates externally input data to a channel bit stream in accordance with a predetermined modulation algorithm, such as RLL (1,7) modulation techniques.

The recording waveform generator 20 receives the channel bit stream from the channel modulator 30 to generate a recording waveform for writing the channel bit stream according to information on a recording pattern. The recording waveform includes a box type recording pattern composed of a first pulse having a first power level and a second pulse having a power level lower than the first power level. The recording waveform will be described later in greater detail.

The pickup unit 10 irradiates light to the optical recording medium 100 according to the generated recording waveform in order to form a mark or a space. The pickup unit 10 includes a motor (not shown) which rotates the optical recording medium 100, an optical head (not shown) which irradiates a laser light from a laser source (not shown) to the optical recording medium 100 or receives a laser light reflected from the optical recording medium 100, a servo circuit (not shown) which servo-controls the motor and the optical head, and a laser driving circuit (not shown) which drives a laser installed at the servo circuit and the optical head.

The recording apparatus 1 may perform a write test and an erase test on a test area of the optical recording medium 100 by using specific test data (arbitrary data or predetermined data) according to parameter information of the box type recording pattern. After performing the write test and the erase test, the recording apparatus 1 may select an optimal condition (e.g., a minimum jitter value, a maximum resolution, a maximum modulation rate) from the test conditions according to the test result. The selected condition may then be applied to the recording waveform generator 20.

FIG. 6 is a block diagram of a recording apparatus 2 according to another embodiment of the present invention. Referring to FIG. 6, the recording apparatus 2 records data by forming a mark or a space in an optical recording medium 100. The recording apparatus 2 includes a pickup unit 10, a recording waveform generator 20, a channel modulator 30, a signal processor 40, and a controller 50.

The channel modulator 30 modulates externally input data to a channel bit stream in accordance with a predetermined modulation algorithm, such as RLL (1,7) modulation techniques.

The recording waveform generator 20 receives the channel bit stream from the channel modulator 30 to generate a recording waveform for writing the channel bit stream. The pickup unit 10 irradiates light to the optical recording medium 100 according to the generated recording waveform so as to form the mark or the space.

More specifically, the channel modulator 30 modulates input data to a channel bit stream, thereby outputting non return to zero inverted (NRZI) data. The recording waveform generator 20 generates a recording waveform for writing the NRZI data and supplies the generated waveform to a laser driving circuit (not shown) included in the pickup unit 10. It is understood that the invention is not limited to using NRZI data, and may instead use other types of data, such as non return to zero (NRZ) data.

The laser driving circuit (not shown) receives the recording waveform to control the laser source (not shown) to irradiate laser light onto the optical recording medium 100 so as to form the mark or the space.

In particular, the pickup unit 10 reads information on a recording pattern from a specific area of the optical recording medium 100. The signal processor 40 performs signal processing of the information on the read recording pattern and transmits the result of the signal processing to the controller 50. The controller 50 transmits the information on the recording pattern to the recording waveform generator 20. The recording waveform generator 20 generates a recording waveform for writing channel data received from the channel modulator 30 according to the information on the recording pattern received from the controller 50. The information on the recording pattern read from the optical recording medium 100 contains parameter information for generating a box type recording pattern composed of a first pulse having a first power level and a second pulse having a power level lower than the first power level. The parameter information for generating the box type recording pattern will be described later.

FIGS. 7A, 7B and 7C illustrate a box type recording pattern and a mark formed by using the box type recording pattern according to an embodiment of the present invention. FIG. 7A shows NRZI data for a mark of length 5 T. FIG. 7B shows a box type recording pattern for recording the mark of length 5 T shown in FIG. 7A. FIG. 7C shows a shape of a mark formed in an information storing medium by using the box type recording pattern shown in FIG. 7B.

Referring to FIG. 7A, the NRZI data for the mark of length 5 T has a rising edge at a start point 90 and a falling edge at an end point 95. After the NRZI data for the mark of length 5 T begins, a time point that is 1 T from the start point is indicated by a reference numeral 91, a time point that is 2 T from the start point is indicated by a reference numeral 92, a time point that is 3 T from the start point is indicated by a reference numeral 93, a time point that is 4 T from the start point is indicated by a reference numeral 94, and a time point that is 5 T from the start point is indicated by a reference numeral 95. However, such a mark length is not limited thereto.

Referring to FIG. 7B, the box type recording pattern includes a first pulse 70 having a first power level Pw1 and a second pulse 80 having a second power level Pw2 which is different from the first power level. Preferably, the second power level Pw2 is lower than the first power level Pw1. However, the second power level Pw2 is not limited to being lower than the first power Pw1. Additionally, the first and second power levels Pw1 and Pw2 may be adjusted depending on recording conditions, such as an amount of heat accumulation. Also, more than two power levels may be used to reduce the effects of heat accumulation.

The duration of the first pulse 70 is determined according to a mark length. The second pulse 80 is positioned at a trailing portion of the box type recording pattern. For example, the start point of the second pulse 80 may be positioned at a time point of (n−1)T when the mark length is nT. Referring to FIG. 7B, the mark length is equal to 5 T, and the start point of the second pulse 80 is equal to the time point 94 because (n−1)T=(5−1)T=4 T. However, the start point of the second pulse is not limited to being at a position (n−1)T.

The parameter of the box type recording pattern may have various forms. For example, the parameter may include a start point 71 of the first pulse 70, a duration 72 of the first pulse 70, a duration 82 of the second pulse 80, a total duration 73 of the first pulse 70 and the second pulse 80, an end point 81 of the second pulse 80, and an end point of a cooling pulse 110. The start point 71 of the first pulse 70 may be determined by a distance from the start point 90 of the mark. Alternatively, the start point 71 may be determined by a distance from the time point 91 that is 1 T from the start point of the NRZI data for forming the mark. Furthermore, the start point 71 may be determined by a distance from various other time points, such as 92, 93, etc. In addition, the end point 81 of the second pulse 80 may be determined by a distance from (n−1)T. Alternatively, the end point 81 may be determined by a distance from the end point 95 of the mark. Furthermore, the end point 81 may be determined by a distance from various other times points, such as 92, 93, etc.

The parameter having various forms will now be described in detail with reference to FIGS. 8A, 8B, 9A, 9B, 10A, 10B, 11A, 11B, 12A, 12B, 13A and 13B. When data is an optical recording medium using the box type recording pattern shown in FIG. 7B, which includes two pulses having the first and second power levels, a mark having a regular shape and a uniform width as shown in FIG. 7C may be obtained.

Figures 3A, 3B:
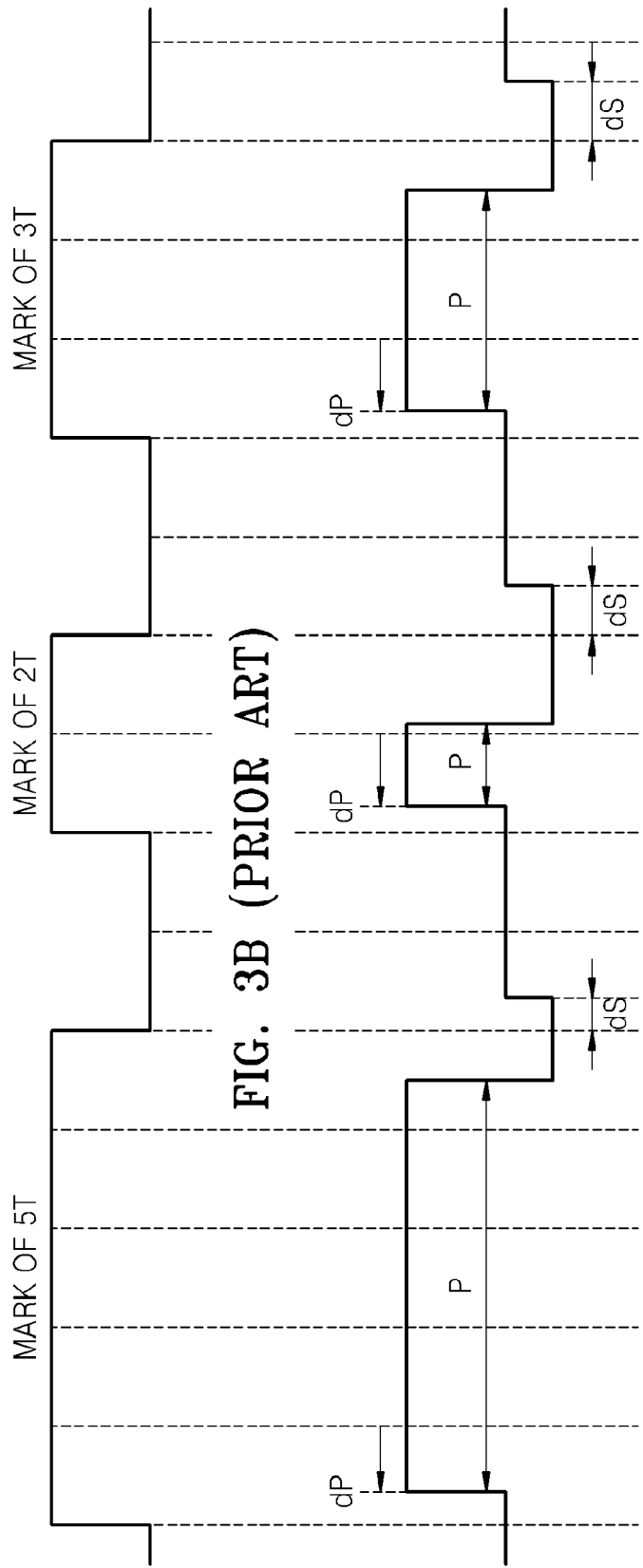
FIG. 3A illustrates a waveform diagram of a conventional recording waveform.
FIG. 3B illustrates a conventional single-pulse recording pattern.
Figure 4A:
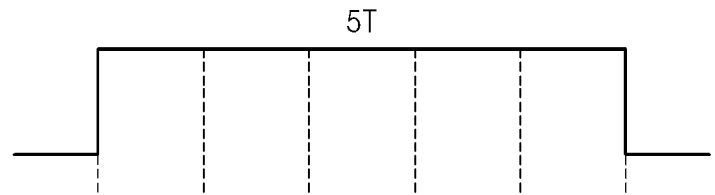
FIG. 4A illustrates a recording mark of length 5 T.
Figure 4B:
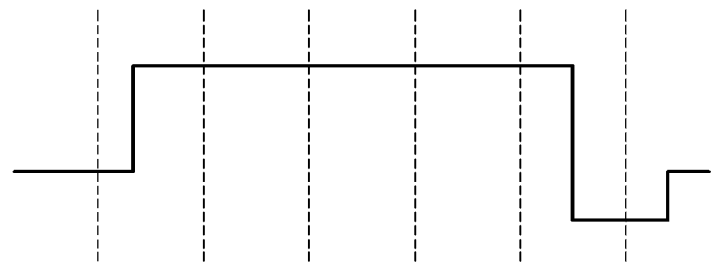
FIG. 4B illustrates an example of a single-pulse recording pattern used to form the recording mark illustrated in FIG. 4A.
Figure 4C:
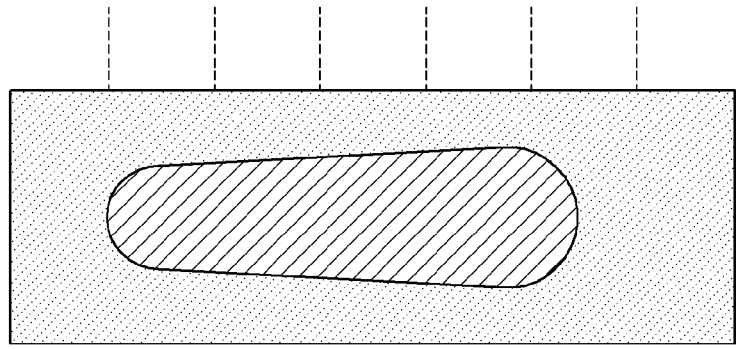
FIG. 4C illustrates a simulation result of the recording mark formed by using the single-pulse recording pattern shown in FIG. 4B.

Table #5 below shows a result of quality (also referred to as "jitter") at 4× multi-speed recording by using the box type write strategy shown in FIG. 7B. Recording conditions are the same as those described with reference to FIG. 3. Using the box type write strategy shown in FIG. 7C decreases the amount of jitter in comparison to the jitter generated by conventional write strategies.

| jitter at 4x multi-speed recording | 6.2% |
| --- | --- |

Examples of a parameter for a box type recording pattern according to aspects of the present invention will now be described with reference to FIGS. 8A, 8B, 9A, 9B, 10A, 10B, 11A, 11B, 12A, 12B, 13A and 13B. In the recording apparatus according to aspects of the present invention, a recording waveform for recording data is generated by using parameters for the box type recording pattern. Furthermore, according to aspects of the present invention, parameter information for the box type recording pattern is recorded in a specific area of an information storage medium, and parameter information for the box type recording pattern recorded in the specific area of the information storage medium is read in order to generate a recording waveform for recording data on the basis of the parameter information. The parameter information for the box type recording pattern may vary depending on various recording conditions, such as, for example, a recording speed, a recording layer location, and a recording layer material.

FIGS. 8A and 8B illustrate a first example of a parameter for a box type recording pattern according to an embodiment of the present invention. FIG. 8A illustrates a waveform diagram of a recording waveform, and FIG. 8B illustrates a first example of a box type recording pattern. Referring to FIG. 8B, the box type recording pattern includes a first pulse 70 having a first power level Pw1 and a second pulse 80 having a second power level Pw2 lower than the first power level Pw1. The first example of the parameter for the box type recording pattern includes a start point dP of the first pulse 70, a duration P of the box type recording pattern, and an end point dS of a cooling pulse 110.

The start point dP of the first pulse 70 of the box type recording pattern according to the example shown in FIG. 8 is measured starting from a time point that is 1 T from the start point for forming the recording data. The duration P of the box type recording pattern denotes a total duration of a write pulse from the start point dP of the first pulse 70 to an end point EP of the second pulse 80. The end point dS is an end point of a cooling pulse 110 that is measured from an end point of the recording data.

FIGS. 9A and 9B illustrate a second example of a parameter for a box type recording pattern according to an embodiment of the present invention. FIG. 9A illustrates a waveform diagram of a recording waveform, and FIG. 9B illustrates a second example of a box type recording pattern. Referring to FIG. 9B, the box type recording pattern includes a first pulse 70 having a first power level Pw1 and a second pulse 80 having a second power level Pw2 lower than the first power level Pw1. The second example of the parameter for the box type recording pattern includes a start point dP of the first pulse 70, a duration P of the box type recording pattern, and an end point dS of a cooling pulse 110.

The start point dP of the first pulse 70 of the box type recording pattern according to the example shown in FIG. 9 is measured starting from a mark start point MSP. The duration P of the box type recording pattern denotes a total duration of a write pulse from the start time dP of the first pulse 70 to an end point EP of the second pulse 80. The end point dS is an end point of a cooling pulse 110 that is measured from an end point of the recording data.

FIGS. 10A and 10B illustrate a third example of a parameter for a box type recording pattern according to an embodiment of the present invention. FIG. 10A illustrates a waveform diagram of a recording waveform, and FIG. 10B illustrates a third example of a box type recording pattern. Referring to FIG. 10B, the box type recording pattern includes a first pulse 70 having a first power level Pw1 and a second pulse 80 having a second power level Pw2 lower than the first power level Pw1. The third example of the parameter for the box type recording pattern includes a start point dP of the first pulse 70, a duration P of the first pulse 70, an end point L of the second pulse 80, and an end point dS of a cooling pulse 110.

The start point dP of the first pulse 70 of the box type recording pattern according to the example shown in FIG. 10 is measured starting from a time point that is 1 T from the start point for forming the recording data. The duration P of the first pulse 70 denotes a length from the start point dP of the first pulse 70 to a start point of the second pulse 80. The end point L of the second pulse 80 is measured starting from a first pulse end point FEP. The end point dS is an end point of a cooling pulse 110 that is measured from an end point of the recording data.

Figures 11A, 11B:
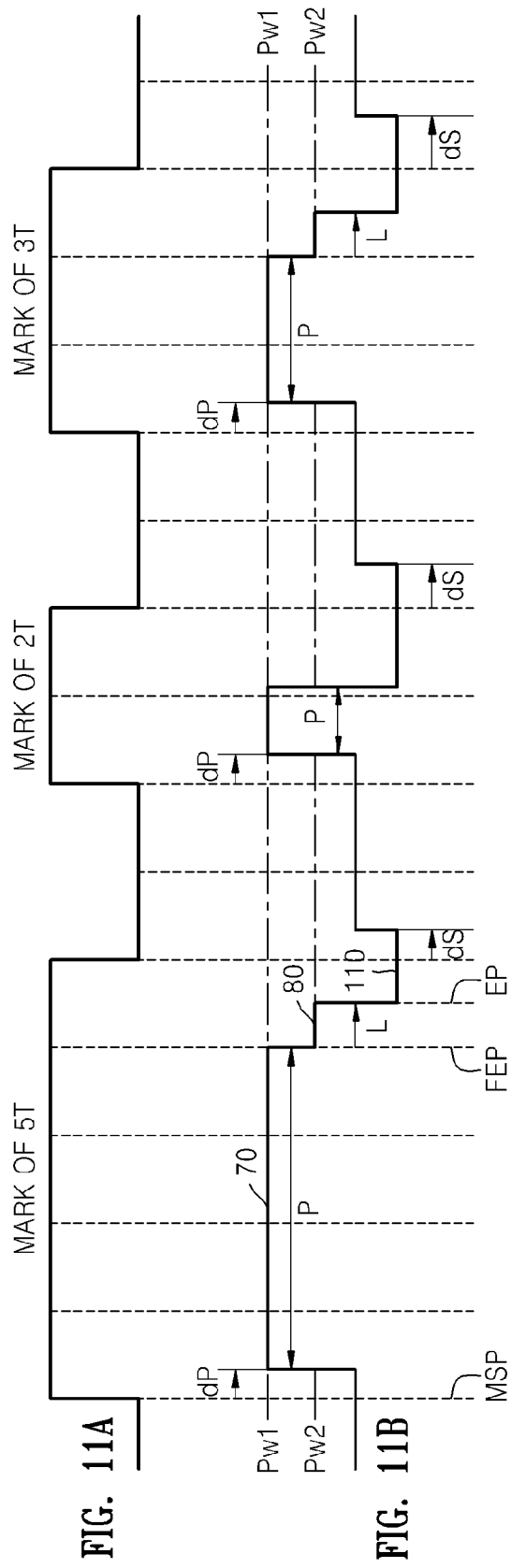
FIG. 11A illustrates a waveform diagram of a recording waveform.
FIG. 11B illustrates a fourth example of a box type recording pattern according to an embodiment of the present invention.

FIGS. 11A and 11B illustrate a fourth example of a parameter for a box type recording pattern according to an embodiment of the present invention. FIG. 11A illustrates a waveform diagram of a recording waveform, and FIG. 11B illustrates a fourth example of a box type recording pattern. Referring to FIG. 11B, the box type recording pattern includes a first pulse 70 having a first power level Pw1 and a second pulse 80 having a second power level Pw2 lower than the first power level Pw1. The fourth example of the parameter for the box type recording pattern includes a start point dP of the first pulse 70, a duration P of the first pulse 70, an end point L of the second pulse 80, and an end point dS of a cooling pulse 110.

The start point dP of the first pulse 70 of the box type recording pattern according to the example shown in FIG. 11 is measured starting from a mark start point MSP. The duration P of the first pulse 70 denotes a length from the start point dP of the first pulse 70 to a start point of the second pulse 80. The end point L of the second pulse 80 is measured starting from a first pulse end point FEP. The end point dS is an end point of a cooling pulse 110 that is measured from an end point of the recording data.

FIGS. 12A and 12B illustrate a fifth example of a parameter for a box type recording pattern according to an embodiment of the present invention. FIG. 12A illustrates a waveform diagram of a recording waveform, and FIG. 12B illustrates a fifth example of a box type recording pattern. Referring to FIG. 12, the box type recording pattern includes a first pulse 70 having a first power level Pw1 and a second pulse 80 having a second power level Pw2 lower than the first power level Pw1. The fifth example of the parameter for the box type recording pattern includes a start point dP of the first pulse 70, a duration P of the first pulse 70, an end point dL of the second pulse 80, and an end point dS of a cooling pulse 110.

The start point dP of the first pulse 70 of the box type recording pattern according to the example shown in FIG. 12 is measured starting from a time point that is 1 T from the start point for forming the recording data. The duration P of the first pulse 70 denotes a length from the start point dP of the first pulse 70 to a start point of the second pulse 80. The end point dL of the second pulse 80 is measured starting from a mark end point MEP. The end point dS is an end point of a cooling pulse 110 that is measured from an end point of the recording data.

FIGS. 13A and 13B illustrate a sixth example of a parameter for a box type recording pattern according to an embodiment of the present invention. FIG. 13A illustrates a waveform diagram of a recording waveform, and FIG. 13B illustrates a sixth example of a box type recording pattern. Referring to FIG. 13B, the box type recording pattern includes a first pulse 70 having a first power level Pw1 and a second pulse 80 having a second power level Pw2 lower than the first power level Pw1. The sixth example of the parameter for the box type recording pattern includes a start point dP of the first pulse 70, a duration P of the first pulse 70, an end point dL of the second pulse 80, and an end point dS of a cooling pulse 110.

The start point dP of the first pulse 70 of the box type recording pattern is measured starting from a mark start point MSP. The duration P of the first pulse 70 denotes a length from the start point dP of the first pulse 70 to a start point of the second pulse 80. The end point dL of the second pulse 80 is measured starting from a mark end point MEP. The end point dS is an end point of a cooling pulse 110 that is measured from an end point of the recording data.

Figure 14:
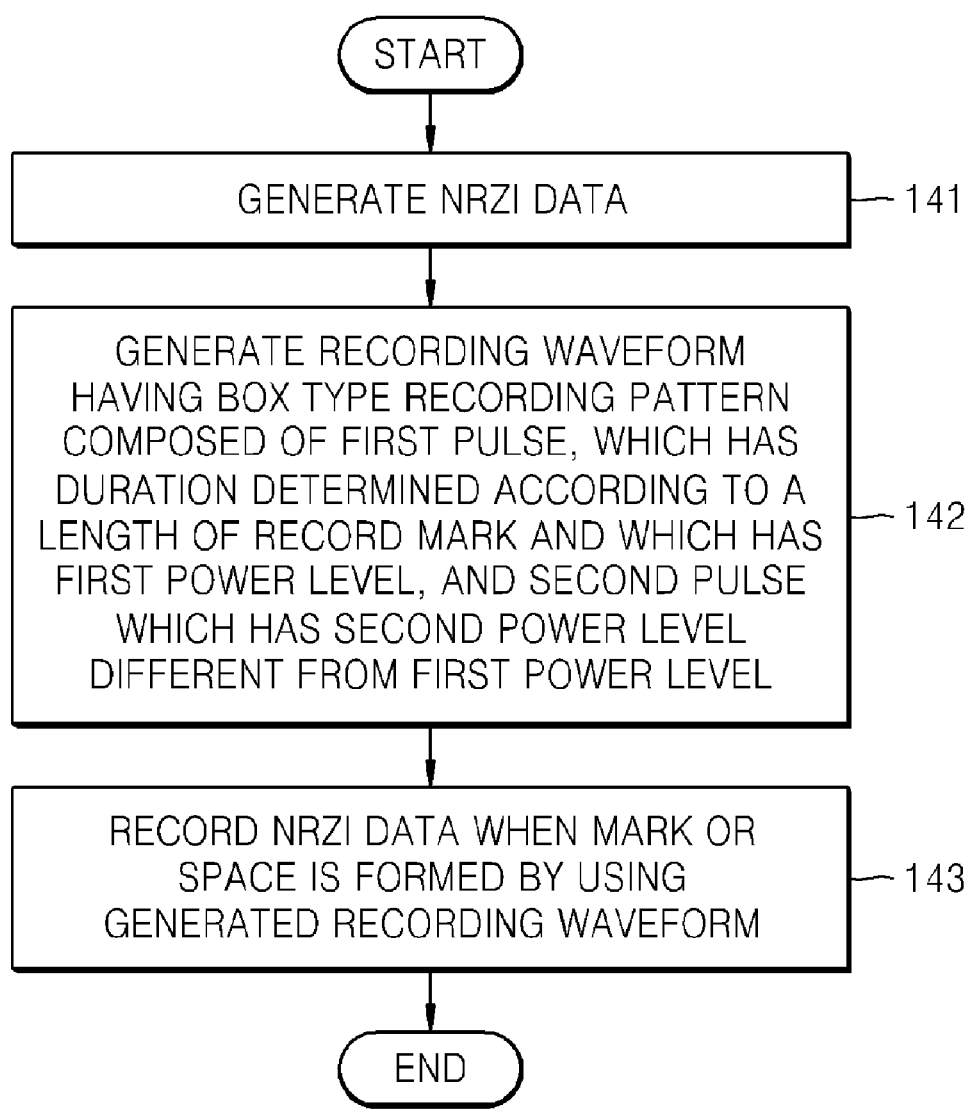
FIG. 14 is a flowchart of a data recording method according to an embodiment of the present invention.

FIG. 14 is a flowchart of a data recording method according to an embodiment of the present invention.

First, non return to zero inverted (NRZI) data is generated at block 141.

Next, a recording waveform is generated which has a box type recording pattern composed of a first pulse which has a first power level and which has a duration determined according to a length of a recording mark, and a second pulse which has a second power level different from the first power level, at block 142. Preferably, the second power level is lower than the first power level.

Next, at block 143, NRZI data is recorded when a mark or a space is formed by using the recording waveform generated at block 142.

Figure 15:
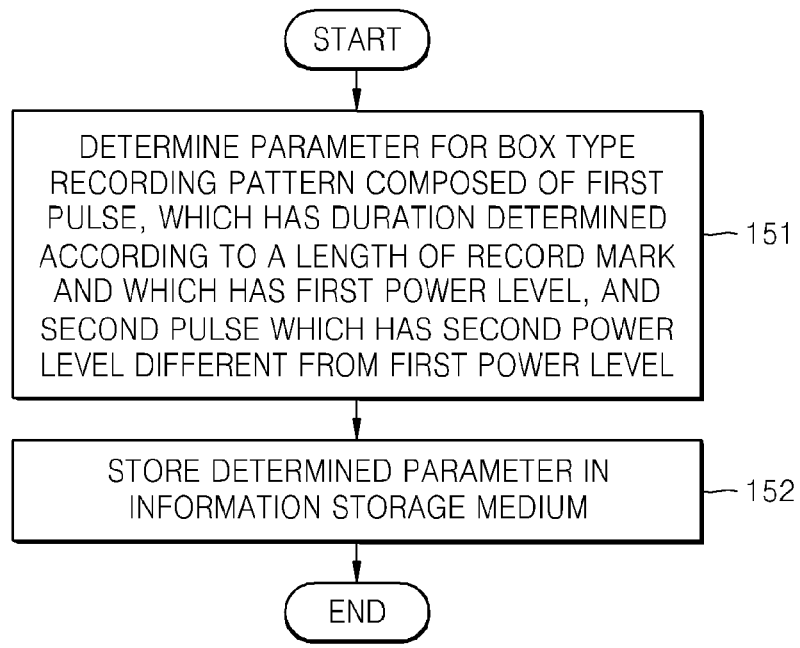
FIG. 15 is a flowchart of a parameter recording method according to an embodiment of the present invention.

FIG. 15 is a flowchart of a parameter recording method according to an embodiment of the present invention.

Referring to FIG. 15, a parameter is determined for a box type recording pattern composed of a first pulse which has a first power level and which has a duration determined according to a length of a recording mark, and a second pulse which has a second power level different from the first power level, at block 151. Preferably, the second power level is lower than the first power level.

Next, the parameter determined at block 151 is stored in an information storage medium at block 152.

Figure 16:
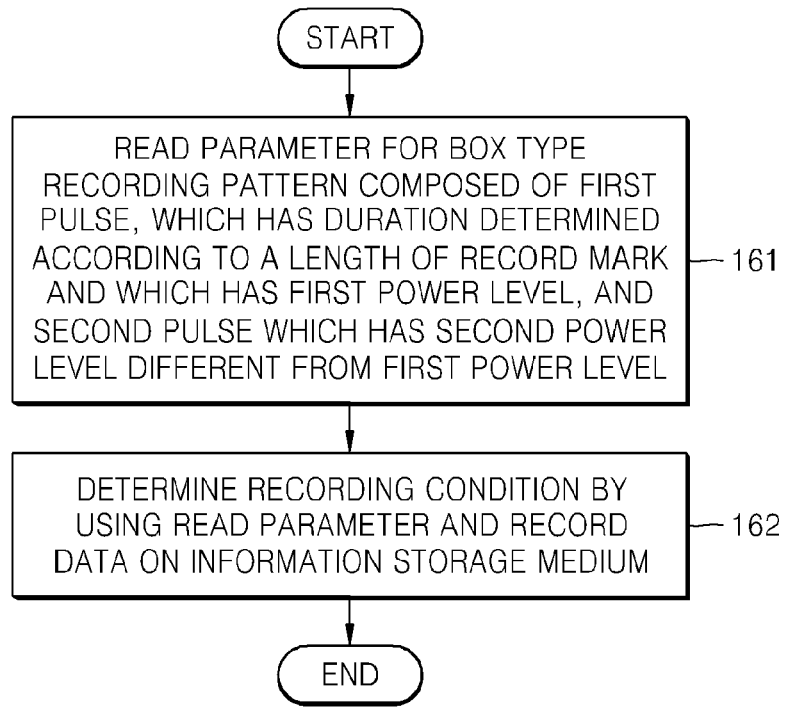
FIG. 16 is a flowchart of a method of using a parameter after reading the parameter from an information storage medium according to an embodiment of the present invention.

FIG. 16 is a flowchart of a method of using a parameter after reading the parameter from an information storage medium according to an embodiment of the present invention.

Referring to FIG. 16, parameter information is read from an information storage medium, wherein the parameter information is information regarding a box type recording pattern composed of a first pulse which has a first power level and which has a duration determined according to a length of a recording mark and a second pulse which has a second power level different from the first power level, at block 161. Preferably, the second power level is lower than the first power level.

Next, at block 162, a recording condition is determined by using the parameter information read at block 161, and data is stored in the information storage medium based on the determined recording condition.

According to aspects of the present invention, a trailing portion of a mark can be easily regulated in a high multi-speed recording medium, thereby improving the quality of a reproducing signal.

Aspects of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer readable recording medium can also be distributed over network coupled computer systems so that the computer readable code is stored and executed in a distributed fashion. Also, functional programs, codes, and code segments for accomplishing aspects of the present invention can be easily construed by programmers skilled in the art to which the present invention pertains.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. For example, in FIG. 8B, the box type recording pattern is not limited to having a first pulse 70 and a second pulse 80, and may instead have a series of pulses which each correspond to different power levels. Additionally, FIGS. 8A, 8B, 9A, 9B, 10A, 10B, 11A, 11B, 12A, 12B, 13A and 13B are not required to have a first pulse and a second pulse, and may instead have a single pulse which has an adjustable power level, or may have more than two pulses. Accordingly, it is intended, therefore, that the present invention not be limited to the various example embodiments disclosed, but that the present invention includes all embodiments falling within the scope of the appended claims.

What is claimed is:

1. A method of recording data corresponding to a channel modulated data mark of length nT in an optical recording medium, the method comprising:

generating a single-pulse type recording pattern including a first pulse comprising a first power level, a second pulse comprising a second power level lower than the first power level, and a cooling pulse comprising a third power level lower than the second power level, based on information on the recording pattern; and recording data according to the recording pattern on the optical recording medium, wherein the information on the recording pattern comprises:

information regarding the length of the first pulse, information regarding a start point of the first pulse which is determined from a point 1T into the channel modulated data mark, information regarding an end point of the second pulse which is determined from a point (n−1)T into the channel modulated data mark, and information regarding an end point of the cooling pulse which is determined from a point nT into the channel modulated data mark, and wherein:

T is a time period of a clock pulse, and n is an integer greater than 1.

2. The method of claim 1, wherein the information on the recording pattern further comprises information on the first power level, information on the second power level, and information on the third power level.

3. The method of claim 1, wherein:

the information regarding the start point of the first pulse comprises a distance between the start point of the first pulse and a point 1T into the channel modulated data mark;

the information regarding the end point of the second pulse comprises a distance between a point (n−1)T into the channel modulated data mark and the end point of the second pulse; and information regarding the end point of the cooling pulse comprises a distance between a point nT into the channel modulated data mark and the end point of a cooling pulse.

4. The method of claim 1, wherein, the first pulse, the second pulse, and the third pulse are sequentially arranged.

5. An apparatus for recording data on an optical recording medium, the apparatus comprising:
   a recording waveform generator configured to generate a single-pulse type recording pattern including a first pulse comprising a first power level, a second pulse comprising a second power level lower than the first power level, and a cooling pulse comprising a third power level lower than the second power level, based on information on the recording pattern according to a channel modulated data mark of length nT; and
   a pickup unit configured to record the recording mark according to the single-pulse type recording pattern,
   wherein the information on the recording pattern comprises:
      information regarding the length of the first pulse,
      information regarding a start point of the first pulse which is determined from a point 1T into the channel modulated data mark,
      information regarding an end point of the second pulse which is determined from a point (n−1)T into the channel modulated data mark, and
      information regarding an end point of the cooling pulse which is determined from a point nT into the channel modulated data mark, and
   wherein:
      T is a time period of a clock pulse, and
      n is an integer greater than 1.

6. The apparatus of claim 5, wherein the information on the recording pattern further comprises information on the first power level, information on the second power level, and information on the third power level.

7. The apparatus of claim 5, wherein:
   the information regarding the start point of the first pulse comprises a distance between the start point of the first pulse and a point 1T into the channel modulated data mark;
   the information regarding the end point of the second pulse comprises a distance between a point (n−1)T into the channel modulated data mark and the end point of the second pulse; and
   information regarding the end point of the cooling pulse comprises a distance between a point nT into the channel modulated data mark and the end point of a cooling pulse.

8. The apparatus of claim 5, wherein the first pulse, the second pulse, and the third pulse are sequentially arranged.

9. An optical recording medium for a recording and/or reproducing apparatus, the optical recording medium comprising:
   an area where parameter information on a recording pattern is recorded, the parameter information on the recording pattern being used in generating a single-pulse type recording pattern comprising a first pulse comprising a first power level, a second pulse comprising a second power level lower than the first power level, and a cooling pulse comprising a third power level lower than the second power level, according to a channel modulated data mark of length nT,
   wherein the parameter information on the recording pattern comprises:
      information regarding the length of the first pulse;
      information regarding a start point of the first pulse which is determined from a point 1T into the channel modulated data mark,
      information regarding an end point of the second pulse which is determined from a point (n−1)T into the channel modulated data mark, and
      information regarding an end point of the cooling pulse which is determined from a point nT into the channel modulated data mark, and
   wherein:
      T is a time period of a clock pulse, and
      n is an integer greater than 1.

10. The optical recording medium of claim 9, wherein the information on the recording pattern further comprises information on the first power level, information on the second power level, and information on the third power level.

11. The optical recording medium of claim 9, wherein:
   the information regarding the start point of the first pulse comprises a distance between the start point of the first pulse and a point 1T into the channel modulated data mark;
   the information regarding the end point of the second pulse comprises a distance between a point (n−1)T into the channel modulated data mark and the end point of the second pulse; and
   information regarding the end point of the cooling pulse comprises a distance between a point nT into the channel modulated data mark and the end point of a cooling pulse.

12. The optical recording medium of claim 9, wherein the first pulse, the second pulse, and the third pulse are sequentially arranged.

* * * * *